United States Patent [19]

DiMaria

[11] Patent Number: 4,741,261
[45] Date of Patent: May 3, 1988

[54] COOKING APPARATUS

[75] Inventor: Bruno DiMaria, Nobleton, Canada

[73] Assignee: 630387 Ontario Limited, Mississauga, Canada

[21] Appl. No.: 7,569

[22] Filed: Jan. 28, 1987

[51] Int. Cl.<sup>4</sup> .......................... A47J 27/16; A47J 27/21
[52] U.S. Cl. ........................................ 99/330; 99/331; 99/332; 99/342; 99/403; 99/407
[58] Field of Search ................. 99/330, 332, 337, 338, 99/339, 335, 336, 334, 342, 344, 359, 367, 368, 370, 371, 403, 405, 407, 410, 427, 443 R; 426/508–511; 126/348, 373, 377, 383–386, 33, 78

[56] References Cited

U.S. PATENT DOCUMENTS

| | | | |
|---|---|---|---|
| 3,608,473 | 9/1971 | Kearn et al. | 99/443 R X |
| 3,944,678 | 3/1976 | Pratolongo | 426/508 |
| 3,958,503 | 5/1976 | Moore | 426/509 |
| 4,173,215 | 11/1979 | Bureau | 99/330 X |
| 4,214,514 | 7/1980 | Contino et al. | 99/337 X |
| 4,543,878 | 10/1985 | Luchetti | 99/330 |
| 4,569,277 | 2/1986 | Stiglich | 99/342 X |
| 4,619,189 | 10/1986 | Kou | 99/337 X |
| 4,635,812 | 1/1987 | Mueller | 99/426 X |

FOREIGN PATENT DOCUMENTS

| | | | |
|---|---|---|---|
| 94066 | 5/1985 | Japan | 99/410 |
| 2124891 | 2/1984 | United Kingdom | 99/411 |

Primary Examiner—Donald Watkins

[57] ABSTRACT

A machine for the rapid and simultaneous cooking of separate quantities of pasta consists of a cabinet containing a number of cooking pots. Each load of pasta is suspended in a pot by means of a perforated basket. The apparatus includes supplies of hot water and of steam. A valve assembly operated by a controller charges each pot with hot water and then injects steam into the water to maintain it at a boiling temperature to cook the pasta. After an appropriate cooking time, determined either by the controller or manually, the supply of steam is stopped and the pot is drained. The basket with the cooked pasta can be removed from the pot for serving.

3 Claims, 2 Drawing Sheets

COOKING APPARATUS

FIELD OF THE INVENTION

This invention relates to a cooking method and to apparatus for practicing such method.

More specifically, the apparatus is designed for cooking food material, especially a pasta product, on a commercial scale, the primary objective being to permit rapid cooking of individual quantities of food in a restaurant or fast food outlet.

Since the invention has been developed primarily for the cooking of pasta products, the discussion below of the specific form of apparatus illustrated in the drawings will be based on the assumption that it is pasta that is to be cooked. Nevertheless it should be understood that the method and apparatus can also be used with equal utility for cooking other foods that need to be cooked in boiling water.

SUMMARY OF THE INVENTION

Basically, the invention consists of a method of cooking comprising immersing a load of food material in water while injecting steam into the water to maintain the same at a boiling temperature.

After a selected cooking time (determined either by an automatic timer or manually by an operator) the cooked food material and the water are separated, preferably by draining the water from the pot in which the cooking took place.

For convenience, the food material can be placed in a perforated basket that is suspended in the boiling water. This facilitates removal of the cooked food material from the drained pot, leaving the latter ready for immediate reuse.

In the preferred form of apparatus, a plurality, e.g. ten, such cooking pots with associated baskets and water and steam supply pipes, valves, controls etc. are mounted in a common cabinet, so that a number of different food orders can be cooked simultaneously.

DETAILED DESCRIPTION OF THE PREFERRED EMBODIMENT

Figure 1:
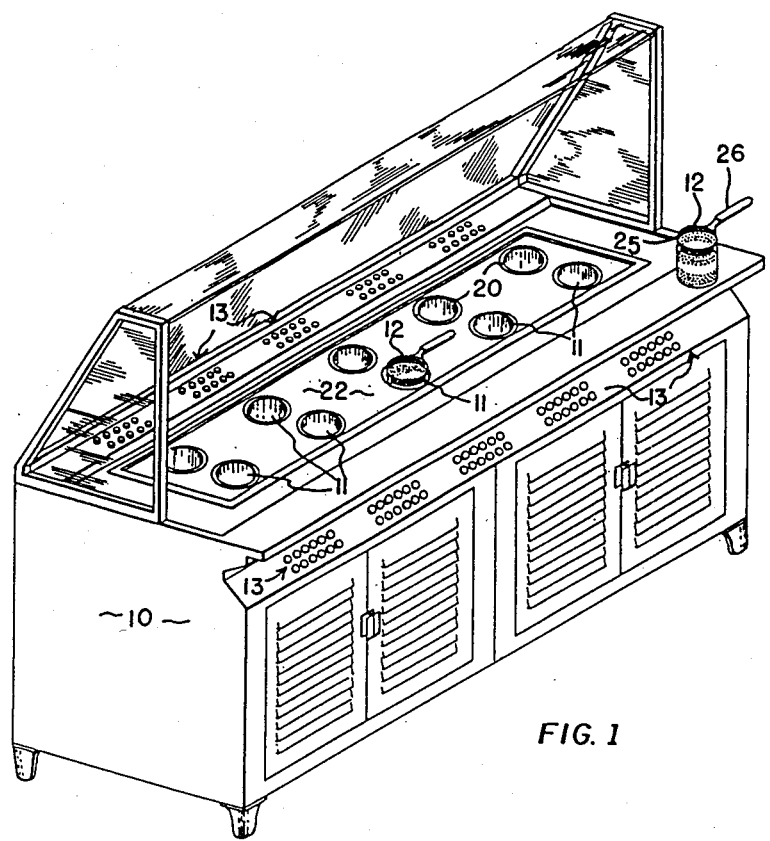
FIG. 1 is a perspective view of a machine according to an embodiment of the invention.

As seen in FIG. 1, the machine consists of a cabinet 10, set into an upper surface of which there are a number of cooking pots 11. A perforated basket 12 will be supplied for each pot 11 and a set of controls and indicator lamps, shown collectively at 13, corresponds to each pot 11.

Figure 2:
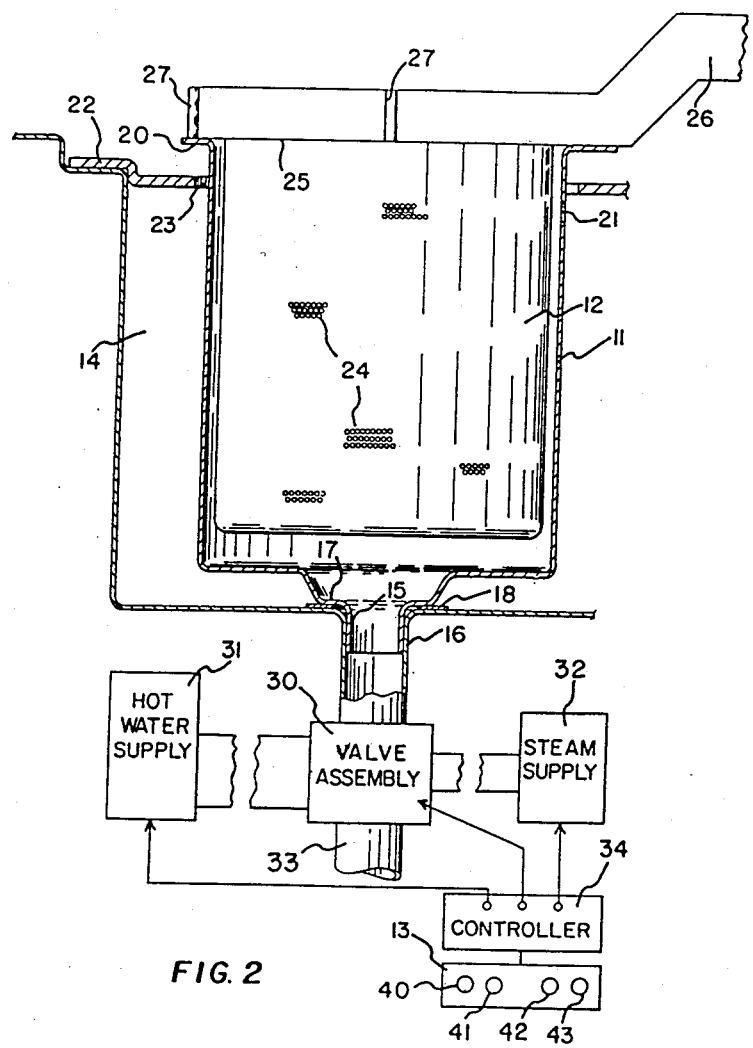
FIG. 2 is a cross-section through a part of the machine, drawn on a larger scale and showing an individual cooking pot with a basket for containing the food material suspended therein.

FIG. 2 shows an individual pot 11 mounted in a cavity 14 in the cabinet 10, the bottom of the pot 11 extending into a threaded conduit 15 that engages in a downwardly extending pipe 16. An annular shoulder 17 on the conduit 15 rests, through a gasket 18, on the bottom of the cavity 14. The cavity 14 will normally be common to all the pots 11 and will have a drain (not shown) for disposal of any liquid spilt into it.

Each pot 11 is open mouthed with an out-turned lip 20, and has at least one hole 21 near its upper edge to allow any excess water in the pot to drain into the cavity 14. A cover member 22, with holes 23 to accommodate each pot 11, forms the upper surface of the cabinet 10.

Each basket 12 is cylindrical, open at the top and closed at the bottom, except that its bottom and most of its cylindrical surface are provided with a large number of perforations 24 small enough to contain the smallest size of pasta or other food material to be cooked, but large enough to provide easy access for water and steam into the interior of the basket. The basket 12 has a rim 25 that extends into a handle 26. The rim 25 has projecting support lugs 27 to prevent the basket falling down into the pot 11. In use, the rim 25 and the lugs 27 seat on the lip 20 of the pot 11 to suspend the basket 12 therein.

The pipe 16 extends to a solenoid-operated valve assembly 30 (shown diagrammatically) that can admit to the pot 11 either hot water from a supply 31, or steam from a supply 32, or both simultaneously, or can discharge the contents of the pot 11 into a drain pipe 33, under the direction of a controller 34 that is arranged to control each pot 11 individually.

A normal cooking cycle consists of the following steps.

The operator places a load (preferably a measured serving) of uncooked pasta in the basket 12, and places the basket 12 in the pot 11. He selects the desired cooking time on a dial 40 and presses a start button 41.

At this point the controller 34 takes over and operates the valve assembly 30 to fill the pot with hot water (already at or very close to the boiling temperature). At the same time the valve assembly injects steam into the pot 11, which flow of steam continues throughout the cooking process, even though the inflow of water will have ceased once the pot has been charged to an appropriate level.

When the desired cooking time is up, the controller 34 operates the valve assembly 30 to shut off the steam supply and to drain the water from the pot 11. An indicator lamp 42 blinks to signal the operator, who removes the basket 12 from the drained pot. The basket now contains the pasta cooked and ready to serve. The blinking lamp can be cancelled by the operator pushing a button 43, or can be cancelled automatically after a set time, or both, as desired.

Obviously, the cooked pasta could be separated from the water (to avoid overcooking) by simply removing the basket from the pot when the indicator lamp blinks, but separation by immediately draining the water from the pot is the preferred method, since it does not rely on the operator taking immediate action to remove the basket and it readies the pot for a further cooking operation with a fresh load of pasta and fresh water.

In a modification of this procedure, known as the standby cycle, the time required can be reduced by first filling the pot with water and injecting the steam to maintain the water boiling, and then placing the basket containing the uncooked pasta in the pot.

In a further modification, the operator can override the timer in the controller by pushing a stop button 44. This allows the operator some discretion regarding cooking time.

I claim:

1. Cooking apparatus comprising
   (a) a cooking pot,
   (b) means for supplying hot water to said pot,
   (c) means for supplying steam to said pot, (d) means for draining the pot, (e) a perforated basket for holding a load of food material in the pot, and (f) control means for
  (i) operating the hot water supply means to charge the pot with hot water an immerse the food material therein,
  (ii) operating the steam supply means to inject steam into the water in the pot to cook the food material, and
  (iii) after a selected cooking time, operating the steam supply means to cease injection of steam and operating the draining means for draining the pot and leaving the cooked food material in the basket.

2. Cooking apparatus according to claim 1, including a plurality of said pots mounted in a common cabinet for simultaneously cooking different loads of food material.

3. Cooking apparatus according to claim 1 or 2, wherein the control means includes for each pot: a start button for use by an operator to initiate a cooking operation; a settable timer for the selected cooking time, operable to control the steam supply means and the draining means; an indicator that the set cooking time has elapsed and that the food material is ready to serve; and a stop button for overriding the timer to operate the steam supply means and the draining means.

* * * * *